(12) United States Patent
Noda et al.

(10) Patent No.: US 6,602,822 B2
(45) Date of Patent: Aug. 5, 2003

(54) CATALYST FOR EXHAUST GAS PURIFICATION AND EXHAUST GAS PURIFICATION SYSTEM USING THE SAME

(75) Inventors: Naomi Noda, Ichinomiya (JP); Yukinari Shibagaki, Kounan (JP); Junichi Suzuki, Kuwana (JP)

(73) Assignee: NGK Insulators, Ltd. (JP)

( * ) Notice: Subject to any disclaimer, the term of this patent is extended or adjusted under 35 U.S.C. 154(b) by 0 days.

(21) Appl. No.: 09/271,155

(22) Filed: Mar. 17, 1999

(65) Prior Publication Data

US 2001/0051590 A1 Dec. 13, 2001

(30) Foreign Application Priority Data

Mar. 24, 1998  (JP) ............................. 10-075651

(51) Int. Cl.⁷ .............................. B01J 23/44; B01J 23/63
(52) U.S. Cl. ....................... 502/339; 502/302
(58) Field of Search ................... 502/302, 339, 502/66, 74

(56) References Cited

U.S. PATENT DOCUMENTS

| | | | | |
|---|---|---|---|---|
| 4,448,756 A | * | 5/1984 | Hammerle et al. | |
| 5,106,588 A | * | 4/1992 | Sims et al. | |
| 5,106,802 A | * | 4/1992 | Horiuchi et al. | |
| 5,439,865 A | * | 8/1995 | Abe et al. | |
| 5,459,119 A | * | 10/1995 | Abe et al. | 502/326 |
| 5,494,878 A | * | 2/1996 | Murakami et al. | |
| 5,525,307 A | * | 6/1996 | Yasaki et al. | |
| 5,672,557 A | * | 9/1997 | Williamson et al. | 502/303 |
| 5,846,502 A | * | 12/1998 | Bourke | |
| 5,878,567 A | * | 3/1999 | Adamczyk, Jr. et al. | |
| 6,029,441 A | * | 2/2000 | Mizuno et al. | |
| 6,043,188 A | * | 3/2000 | Yeo | 502/303 |

FOREIGN PATENT DOCUMENTS

| | | |
|---|---|---|
| EP | 0 749 774 A2 | 12/1996 |
| EP | 0 782 880 A1 | 7/1997 |
| EP | 0 846 491 | * 6/1998 |
| JP | 60-202745 A | * 10/1985 |

* cited by examiner

*Primary Examiner*—Tom Dunn
*Assistant Examiner*—Christina Ildebrando
(74) *Attorney, Agent, or Firm*—Parkhurst & Wendel, L.L.P.

(57) ABSTRACT

A catalyst for exhaust gas purification includes (1) a monolithic carrier having passages and (2) palladium-loaded alumina obtained by immersing alumina in a palladium solution and then firing the resulting alumina and loaded on the monolithic carrier as a catalyst layer. In the catalyst, the catalyst layer loaded on the partition walls of the passages of the monolithic carrier has a thickness of 5 to 100 $\mu$m and the palladium/alumina ($Pd/Al_2O_3$) weight ratio in the catalyst layer is 0.03 to 0.30. This catalyst is a Pd-only catalyst improved in hydrocarbon purifiability during the cold start of engine.

8 Claims, 3 Drawing Sheets

CATALYST FOR EXHAUST GAS PURIFICATION AND EXHAUST GAS PURIFICATION SYSTEM USING THE SAME

BACKGROUND OF THE INVENTION

1. Field of the Invention

The present invention releates to a catalyst for exhaust gas purification capable of effectively purifying the harmful substances present in exhaust gas from engine, particularly the hydrocarbons generated in a large amount during the cold start of engine, as well as to an exhaust gas purification system using the catalyst.

2. Description of Related Art

Active researches and developments have heretofore been made on catalysts for exhaust gas purification, used for purifying the harmful substances present in exhaust gas from automobile engine, such as nitrogen oxides (NOx), carbon monoxide (CO), hydrocarbons (HC) and the like. In recent years, as the regulation on exhaust gas has become stricter, the purification of HC during engine start (hereinafter referred to as "during the cold start") has become an important technical task.

The reason is as follows. During the cold start when the temperature of exhaust gas is low, the catalyst disposed in the exhaust pipe of engine does not reach its light-off temperature and has a low exhaust gas purifiability; moreover, during this period as compared with the period of continuous operation of engine, a large amount of HC is discharged from the engine; as a result, the HC discharged during the cold start occupies a large proportion of the total harmful substances discharged from the engine.

As one means for achieving the above-mentioned technical task, a Pd-only catalyst is known which uses, as the catalyst component, Pd having an excellent low-temperature light-off property. The Pd-only catalyst is produced ordinarily by forming, on a monolithic carrier, a catalyst layer comprising and a heat-resistant inorganic oxide (e.g. $Al_2O_3$) and Pd loaded thereon in a dispersed state.

In purification of HC during the cold start, it is important to activate the catalyst used, as early as possible. The effective means for achieving it includes use of a catalyst of small heat capacity. One parameter for determining the heat capacity of catalyst is the thickness of catalyst layer loaded on monolithic carrier. There is known no conventional Pd-only catalyst in which the thickness of catalyst layer is optimized for the above purpose.

Incidentally, description is made on the thickness of catalyst layer of exhaust gas purification catalyst, in JP-A-5-293376, JP-A-5-293384 and JP-A-6-233918. These descriptions are not for Pd-only catalysts.

SUMMARY OF THE INVENTION

In view of the above situation, the present invention is intended to provide a Pd-only catalyst wherein the thickness of catalyst layer is optimized in order to reduce the heat capacity to achieve early catalyst activation and which is improved in HC purifiability during the cold start.

According to the present invention there is provided a catalyst for exhaust gas purification, comprising (1) a monolithic carrier having passages and (2) palladium-loaded alumina obtained by immersing alumina in a palladium solution and then firing the resulting alumina and loaded on the monolithic carrier as a catalyst layer, in which catalyst the catalyst layer loaded on the partition walls of the passages of the monolithic carrier has a thickness of 5 to 100 $\mu$m and the palladium/alumina ($Pd/Al_2O_3$) weight ratio in the catalyst layer is 0.03 to 0.30.

According to the present invention there is also provided an exhaust gas purification system disposed in an exhaust pipe of internal combustion engine, comprising (a) the above-mentioned catalyst for exhaust gas purification and (b) an adsorbent disposed upstream of the catalyst (a) in the flow direction of the exhaust gas discharged from the engine, which is obtained by loading an adsorbent material having a hydrocarbon adsorptivity, on a monolithic carrier.

In the catalyst layer loaded on a monolithic carrier having passages, its thickness is not uniform at all the sites of the partion walls of the passages and, when the catalyst layer is formed according to an ordinary process, is larger at and around the intersections of the partion walls. Therefore, in the present invention, "the thickness of catalyst layer" refers, when the monolithic carrier has passages 22 having a polygonal sectional shape as shown in FIG. 1(a), to the thickness t of catalyst layer 26 (formed on partion wall 24) at the midpoint of partion wall 24 between the intersections A and B of partion walls 24 forming each passage 22; and when the monolithic carrier has passages 28 formed by placing a corrugated metallic plate 32 on a flat metallic plate 30, as shown in FIG. 1(b), to the thickness t of catalyst layer 34 (formed on partion wall) at the midpoint between the intersections C nd D of flat plate 30 and corrugated plate 32.

BRIEF DESCRIPTION OF THE DRAWINGS

FIG. 1 is a fragmentary enlarged view showing the thickness of the catalyst layer of the present catalyst.

DESCRIPTION OF PREFERRED EMBODIMENTS

Figure 1A:
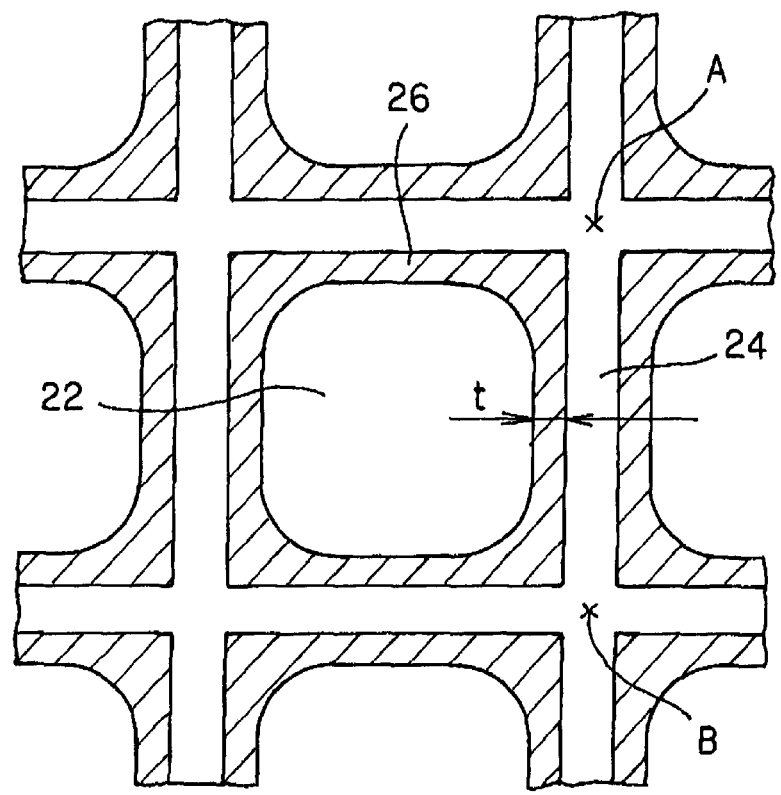
FIG. 1(a) shows the catalyst layer thickness of a monolithic carrier having passages of polygonal sectional shape.
Figure 1B:
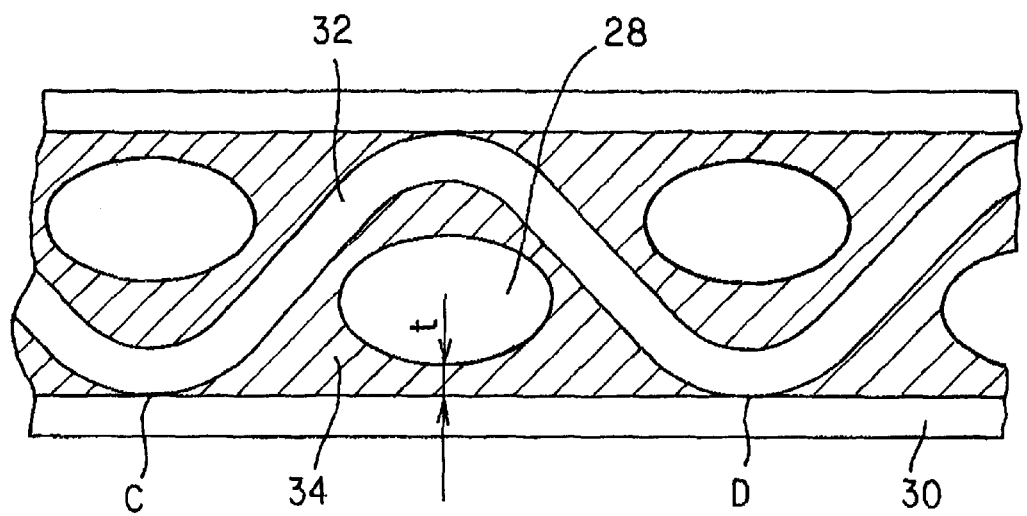
FIG. 1(b) shows the catalyst layer thickness of a monolithic carrier having passages formed by placing a corrugated metallic plate on a flat metallic plate.

The catalyst of the present invention comprises a monolithic carrier and palladium-loaded alumina loaded on the monolithic carrier as a catalyst layer. In the present catalyst, the thickness of the catalyst layer is 5 to 100 $\mu$m, preferably 5 to 50 $\mu$m and is smaller than those in conventional Pd-only catalysts. With this smaller thickness of catalyst layer, the heat capacity of catalyst layer is smaller and the catalyst can be heated into an activated state early even during the cold start of engine. A catalyst layer thickness of less than 5 $\mu$m results in a durability problem; and a catalyst layer thickness of more than 100 $\mu$m results in a larger heat capacity, making difficult the early activation of catlayst.

In the present catalyst, so-called predoping method is employed for formation of the thin catalyst layer; thereby, the present catalyst maintains a sufficient purifiability even after long-term use. As the method for forming a catalyst layer on a monolithic carrier, impregnation method and predoping method are known generally. The impregnation method comprises first loading $Al_2O_3$ on a monolithic carrier to obtain an $Al_2O_3$-loaded monolithic carrier and then dipping it in a noble metal (e.g. Pd) solution to adhere the noble metal to $Al_2O_3$. Meanwhile, the predoping method comprises first dipping $Al_2O_3$ in a noble metal (e.g. Pd) solution, then firing the resulting material to obtain noble metal-loaded $Al_2O_3$ (wherein the noble metal is baked onto $Al_2O_3$), and loading it on a monolithic carrier.

When the two methods are compared, in the impregnation method, the noble metal is present in a large amount in the surface portion of the catalyst layer but the amount is smaller in the inner portion of the catalyst layer. Meanwhile in the predoping method, the noble metal concentration in the catalyst layer is uniform. Therefore, in the present catalyst wherein the catalyst layer is formed by the predoping method, a sufficient amount of Pd is present not only in the surface portion of the catalyst layer but also in the inner portion; as a result, the present catalyst exhibits a high purifiability despite of the thin catalyst layer and, moreover, the thin catalyst layer enables the diffusion of exhaust gas even to the inner portion of catalyst layer and consequent effective utilization of Pd present in the inner portion.

The catalyst of the present invention is a Pd-only catalyst which contains only Pd as the noble metal. Pd as noble metal has a high HC oxidazability and exhibits a catalytic activity even at relatively low temperatures. By using Pd as a catalyst component, a catalyst can be obtained which is superior in low-temperature light-off property. Pd is baked onto $Al_2O_3$ by the predoping method as mentioned previously, and is dispersed and loaded substantially uniformly in the catalyst layer. As the $Al_2O_3$ on which Pd is loaded, one having a specific surface area of 100 $m^2/g$ or more is preferred because Pd is loaded thereon in a highly dispersed state and an excelent low-temperature light-off property and an excellent heat resistance are obtained.

The $Pd/Al_2O_3$ weight ratio in catalyst layer is set at 0.03 to 0.30, preferably 0.06 to 0.18. When the $Pd/Al_2O_3$ ratio is less than 0.03, hindrance to diffusion of exhaust gas is high and no desired amount of HC is purified by Pd; as a result, the overall purifiability of catalyst is inferior. When the $Pd/Al_2O_3$ ratio is more than 0.30, Pd tends to cause sintering, resulting in inferior catalyst durability.

The amount of Pd loaded per unit volume of monolithic carrier is preferably 50 to 500 $g/ft^3$ ($1.76 \times 10^{-3}$ to $1.76 \times 10^{-2}$ g/cc), more preferably 60 to 300 $g/ft^3$ ($2.11 \times 10^{-3}$ to $1.06 \times 10^{-2}$ g/cc). When the amount of Pd loaded is less than 50 $g/ft^3$, there are problems in light-off property and durability. A Pd amount of more than 500 $g/ft^3$ is not preferred from a cost standpoint.

In the catalyst of the present invention, the catalyst layer may contain various additives which can improve the catalytic activity of the catalyst layer or can load the catalyst layer on the monolithic carrier more strongly. Addition of, for example, a rare earth element oxide (e.g. $CeO_2$ or $La_2O_3$) having oxygen storage capacity (OSC), to catalyst layer can allow the catalyst layer to have an improved activity during steady-state driving. The amount of rare earth element oxide added is preferably about 2 to 30% by weight of $Al_2O_3$.

The monolithic carrier on which the catalyst layer is loaded, refers to a structure having passages (cells) surrounded by substantially uniform partition walls (ribs), which is generally called a honeycomb structure. As the material for the monolithic carrier, there are suitably used ceramic materials made of cordierite, mullite or the like; foil-shaped metallic materials made of a heat-resistant stainless steel (e.g. Fe—Cr—Al alloy); and metallic materials molded into a honeycomb structure by powder metallurgy.

The early activation of catalyst is influenced not only by the thickness of catalyst layer but also by the heat capacity of monolithic carrier. The monolithic carrier used in the present catalyst, preferably has a small heat capacity and therefore is desired to have a cell density of 400 $cells/in.^2$ ($cpi^2$) or more and a partition wall (rib) thickness of 7 mil or less.

Next, despcription is made on the exhaust gas purification system of the present invention. The exhaust gas purification system of the present invention is disposed in an exhaust pipe of internal combustion engine and comprises (a) the above-mentioned catalyst for exhaust gas purification according to the present invention and (b) an adsorbent disposed upstream of the catalyst (a) in the flow direction of the exhaust gas discharged from the engine, which is obtained by loading an adsorbent material having a hydrocarbon adsorptivity, on a monolithic carrier.

The present catalyst can reach an activated state early even during the cold start of engine, as mentioned previously; however, before reaching that state, the catalyst is unable to purify the HC which is discharged from the engine in a large amount during the cold start. Therefore, an adsorbent having an HC adsorptivity is disposed upstream of the catalyst to allow the adsorbent to adsorb HC temporarily until the catalyst is activated, whereby the present exhaust gas purification system can have an improved HC purifiability during the cold start.

The adsorbent material used in the adorbent includes zeolite, active carbon, etc. The adsorbent material must have a heat resistance of at least 500° C. for use in an exhaust gas system, and is preferably composed mainly of a zeolite. The zeolite may be any of a natural product or a synthetic product, and has no particular restriction as to the kind. However, a zeolite having a Si/Al molar ratio of 40 or more is preferably used in view of the heat resistance, durability and hydrophobicity. Specific examples of such a zeolite are preferably ZSM-5, USY, β-zeolite, silicalite and a metallosilicate.

The zeolite can be used in one kind or in a combination of two or more kinds. For example, ZSM-5 having relatively small pores of about 0.55 nm in diameter is advantageous for adsorption of small molecules (e.g. propene) but disadvantageous for adsorption of large molecules (e.g. toluene and xylene). Meanwhile, USY having relatively large pores of about 0.74 nm in diameter is disadvantageous for adsorption of small molecules (e.g. propene) but advantageous for adsorption of large molecules (e.g. toluene and xylene).

Therefore, loading of a mixture of ZSM-5 and USY on a monolithic carrier is a preferred method of using the zeolite. Alternatively, ZSM-5 and USY may be loaded on a monolithic carrier apart in the flow direction of exhaust gas; in this case, ZSM-5 is preferably loaded on the upstream side of the carrier because ZSM-5 can adsorb and store HC up to a relatively high temperature of 150° C. Further, β-zeolite is preferred because it has bimodal pores of about 0.55 nm and about 0.70 nm in diameter and can adsorb both small molecules and large molecules relatively well.

While the zeolite can be used as an adsorbent component as it is, it is preferred to load, on the zeolite, at least one noble metal selected from Pt, Pd and Rh because the noble metal loaded on zeolite can suppress the coking of HC appearing simultaneously with adsorption of HC by zeolite. Loading of nobel metal on zeolite allows for regeneration of zeolite without reduction in its adsorptivity for HC.

The noble metal loaded on zeolite is preferably Pd because Pd is most inexpensive and has high regeneratability for zeolite. The loading of noble metal on zeolite is preferably conducted by an ion exchange in view of the thermal stability. The amount of noble metal loaded on zeolite is preferably 5 to 40 g per ft$^3$ of monolithic carrier, in view of the cost and the regeneratability for zeolite. When a zeolite is loaded on a monolithic carrier, the zeolite may contain, as necessary, 5 to 20% by weight of an inorganic binder (e.g. $Al_2O_3$ or $SiO_2$), whereby the zeolite can be loaded on the monolithic carrier strongly without impairing the adsorptivity for HC.

The amount of adsorbent material loaded per unit volume of monolithic carrier is preferably 0.05 to 2.0 g/cc. When the amount of adsorbent material loaded is less than 0.05 g/cc, the resulting adsorbent is unable to have a sufficient HC adsorptivity. When the amount of adsorbent material loaded is more than 2.0 g/cc, the warm-up of the catalyst disposed downstream of the resulting adsorbent is delayed.

In the adsorbent used in the exhaust gas purification system of the present invention, the monolithic carrier may load thereon not only the above-mentioned adsorbent material composed mainly of zeolite but also a catalyst material comprising a heat-resistant inorganic oxide and at least one noble metal (selected from Pt, Pd and Rh) loaded on the inorganic oxide.

When a catalyst material is loaded in addition to the adsorbent material, the HC desorbed from the adsorbent can be purified not only by the downstream catalyst but also by this catlayst material. This catlayst material preferably contains Pd which is superior in low-temperature light-off property. The amount of Pd loaded per unit volume of monolithic carrier is preferably 50 to 250 g/ft$^3$ ($1.76 \times 10^{-3}$ to $8.83 \times 10^{-3}$ g/cc). When the amount of Pd loaded is less than 50 g/ft$^3$, there are problems in light-off property and durability. A Pd amount of more than 250 g/ft$^3$ is not preferred from a cost standpoint.

Even when a noble metal as catalyst material is loaded directly on a zeolite as adsorbent material by ion exchange or the like as mentioned above, the noble metal exhibits a catalytic activity as well; however, a noble metal present in a zeolite tends to cause sintering and shows insufficient durability as a catalyst. Therefore, when the adsorbent is desired to have even a catalytic activity, it is preferred to load, on a monolithic carrier, a catalyst material obtained by loading a noble metal on a heat-resistant inorganic oxide as mentioned previously.

The adsorbent may have a blowing-through hole extending in the flow direction of exhaust gas and having a diameter larger than that of each passage (cell) of the monolithic carrier. By allowing the adsorbent to have such a blowing-through hole and allowing part of the exhaust gas to pass through the blowing-through hole, the warm-up of the catalyst provided downstream of the adsorbent can be promoted and the purification efficiency of desorbed HC by the catalyst is improved.

The diameter of the blowing-through hole is preferably 50 mm or less in view of the strength of carrier, more preferably 40 mm or less in order to suppress the reduction in HC adsorptivity, caused by excessive blowing-through of exhaust gas. Meanwhile, the diameter is preferably 10 mm or more because too small a diameter results in insufficient warm-up of the catalyst disposed downstream of the adsorbent. There is no particular restriction as to the position of the blowing-through hole, and it is not necessary to form the blowing-through hole in the sectional center of the adsorbent.

In the exhaust gas purification system of the present invention, other catalyst may be disposed upstream of the adsorbent or downstream of the present catalyst (disposed downstream of the adosrbent) so that the system can show an improved purifiability during the steady-state driving of engine after the warm-up of the whole system. This other catalyst is preferably a Pt/Rh type catalyst which has proven a high performance as a three-way catalyst for automobile exhaust gas. The other catalyst may be disposed downstream of the present catalyst also when the present exhaust gas purification system uses no adsorbent upstream of the present catalyst.

In conducting exhaust gas purification during the cold start by using the above-described exhaust gas purification system of the present invention, when, for a certain period during the cold start, an oxidizing gas (e.g. secondary air) is introduced into the exhaust gas, or when the ratio of the amount of air for combustion and the amount of fuel is changed so that the oxygen amount in exhaust gas increases, the combustion reaction on catalyst can be promoted and the earlier light-off of catalyst can be achieved. The above introduction of oxidizing gas or the above change of the ratio of the amount of air for combustion and the amount of fuel for increased oxygen supply is also preferred because as the HC adsorbed on the adsorbent begins to be desorbed with the temperature rise of the adsorbent caused by the heat of exhaust gas, the HC concentration in exhaust gas increases and the oxygen required for purification (combustion) of HC becomes short.

EXAMPLES

The present invention is described in detail below by way of Examples. However, the present invention is in no way restricted to these Examples.

[Production of slurries]

(Slurry A)

To a commercial $\gamma$-$Al_2O_3$ were added an aqueous palladium nitrate solution and an appropriate amount of acetic acid. The resulting mixture was pulverized in a ball mill for 15 hours. The resulting slurry was dried at 100° C. for 15 hours, then pulverized, and fired at 550° C. for 3 hours to obtain a Pd-loaded $Al_2O_3$ powder. This powder was mixed with an appropriate amount of water. Thereto were added an appropriate amount of acetic acid and an alumina sol having an alumina solid content of 2.5%. The resulting mixture was pulverized in a ball mill for 15 hours to produce a slurry A. The Pd/-$Al_2O_3$ ratio in the slurry was 0.07.

(Slurry B)

A slurry B was produced in the same manner as for the slurry A except that the Pd/$Al_2O_3$ ratio was 0.35.

(Slurry C)

A slurry C was produced in the same manner as for the slurry A except that the Pd/$Al_2O_3$ ratio was 0.02.

(Slurry D)

To a commercial $\gamma$-$Al_2O_3$ were added cerium acetate and cerium oxide [an improver for oxygen storage capacity (OSC) during steady-state driving] by 30% by weight in terms of oxide. The resulting mixture was wet-pulverized, then dried, and calcinated at 550° C. to obtain an $Al_2O_3.CeO_2$ compound oxide. The compound oxide was impregnated with Pt using an aqueous $H_2PtCl_5$ solution. The Pt-impregnated compound oxide was dried and fired at 500° C. to obtain a Pt-loaded $Al_2O_3.CeO_2$ powder. This powder was mixed with an appropriate amount of water. Thereto were added an appropriate amount of acetic acid and an alumina sol having an alumina solid content of 2.5%. The resulting mixture was pulverized in a ball mill for 15 hours to produce a slurry D.

(Slurry E)

A slurry E was produced in the same manner as for the slurry D except that the aqeuous $H_2PtCl_5$ solution was replaced by an aqueous $Rh(NO_3)_3$ solution.

(Slurry F)

A β-zeolite having a Si/Al molar ratio of 110 was mixed with an appropriate amount of water. Thereto were added an appropriate amount of acetic acid and an alumina sol having an alumina solid content of 2.5%. The resulting mixture was ground in a ball mill for 15 hours to produce a slurry F.

(Slurry G)

A slurry G was produced in the same manner as Slurry A except the $Pd/Al_2O_3$ ratio was only 0.035.

[Production of catalysts]

(Catalyst A)

In the slurry G was dipped a monolithic carrier (a cordierite honeycomb of 93 mm in diameter and 150 mm in length, produced by NGK insulators, Ltd.) so that the amount of Pd loaded on the monolithic carrier became 120 g per ft$^3$ of monolitic carrier. The slurry-loaded monolithic carrier was dried and fired to produce a catalyst A. In the catalyst A, the thickness of the catalyst layer was 10 μm.

(Catalyst B)

In the slurry G was dipped a monolithic carrier (a cordierite honeycomb of 93 mm in diameter and 150 mm in length, produced by NGK insulators, Ltd.) so that the amount of Pd loaded on the monolithic carrier became 300 g per ft$^3$ of monolitic carrier. The slurry-loaded monolithic carrier was dried and fired to produce a catalyst B. In the catalyst B, the thickness of the catalyst layer was 50 μm.

(Catalyst C)

In the slurry G was dipped a monolithic carrier (a cordierite honeycomb of 93 mm in diameter and 150 mm in length, produced by NGK insulators, Ltd.) so that the amount of Pd loaded on the monolithic carrier became 720 g per ft$^3$ of monolitic carrier. The slurry-loaded monolithic carrier was dried and fired to produce a catalyst C. In the catalyst C, the thickness of the catalyst layer was 120 μm.

(Catalyst D)

In the slurry B was dipped a monolithic carrier (a cordierite honeycomb of 93 mm in diameter and 150 mm in length, produced by NGK insulators, Ltd.) so that the amount of Pd loaded on the monolithic carrier became 600 g per ft$^3$ of monolitic carrier. The slurry-loaded monolithic carrier was dried and fired to produce a catalyst D. In the catalyst D, the thickness of the catalyst layer was 10 μm.

(Catalyst E)

In the slurry C was dipped a monolithic carrier (a cordierite honeycomb of 93 mm in diameter and 150 mm in length, produced by NGK insulators, Ltd.) so that the amount of Pd loaded on the monolithic carrier became 30 g per ft$^3$ of monolitic carrier. The slurry-loaded monolithic carrier was dried and fired to produce a catalyst E. In the catalyst E, the thickness of the catalyst layer was 10 μm.

(Catalyst F)

In the slurry D was dipped a monlithic carrier (a cordierite honeycomb of 144 mm in diameter and 110 mm in length, produced by NGK Insulators, Ltd.) so that the amount of Pt-loaded $Al_2O_3.CeO_2$ powder loaded on the monolithic carrier became 0.15 g per cc of monolithic carrier. The resulting material was dried and fired. The fired material was dipped in the slurry E so that the amount of Rh-loaded $Al_2O_3.CeO_2$ powder loaded on the fired material became 0.05 g per cc of monolithic carrier. The resulting material was fired at 500° C. to produce a catalyst F. Incidentally, the total amount of noble metals loaded on the monolithic carrier was 40 g (Pt/Rh=5/1) per ft$^3$ of monolithic carrier.

[Production of adsorbent]

(Adsorbent A)

In the slurry F was dipped a monolithic carrier (a cordierite honeycomb of 118 mm in diamter and 150 mm in length, produced by NGK Insulators, Ltd.) so that the amount of β-zeolite loaded on the monolithic carrier became 0.2 g per cc of monolithic carrier. The resulting material was dried and fired to produce an adsorbent A.

[Constitution of exhaust gas purification systems]

The following exhaust gas purification systems were constituted using the above-obtained catalysts and adsorbent. In the following description, each numerical symbol used in FIGS. 2 to 8 was expressed by showing the numerical symbol in parenthesis, in order to clearly distinguish the numerical symbol from each symbol indicating the kind of each catalyst or adsorbent.

(System A)

Figure 2:
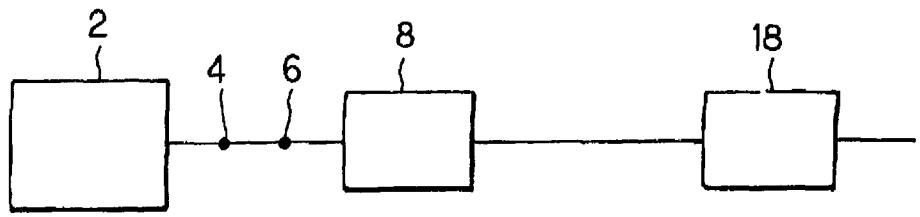
FIG. 2 is a schematic view showing an exhaust gas purification system used in Example 1.

As shown in FIG. 2, the catalyst A (8) was disposed at an upstream position of the exhaust gas flow path of an engine (2). Between the engine (2) and the catalyst A (8) were provided an $O_2$ sensor (4) for A/F control, at an upstream position and a secondary air inlet (6) for light-off acceleration, at a downstream position. The distance between engine manifold outlet and catalyst A (8) was set at 600 mm. Further, the catalyst F (18) was disposed at a position 1,200 mm distant from the engine manifold outlet.

(System B)

Figure 3:
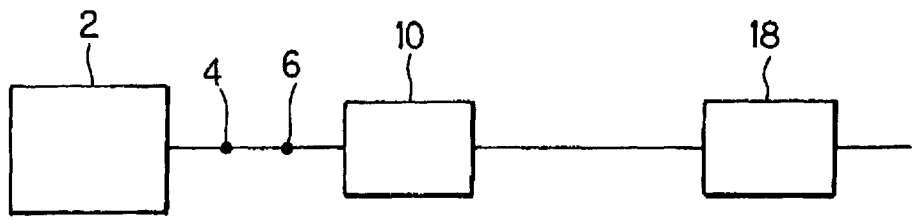
FIG. 3 is a schematic view showing an exhaust gas purification system used in Example 2.

As shown in FIG. 3, the catalyst B (10) was disposed at an upstream position of the exhaust gas flow path of an engine (2). Between the engine (2) and the catalyst B (10) were provided an $O_2$ sensor (4) for A/F control, at an upstream position and a secondary air inlet (6) for light-off acceleration, at a downstream position. The distance between engine manifold outlet and catalyst B (10) was set at 600 mm. Further, the catalyst F (18) was disposed at a position 1,200 mm distant from the engine manifold outlet.

(System C)

Figure 4:
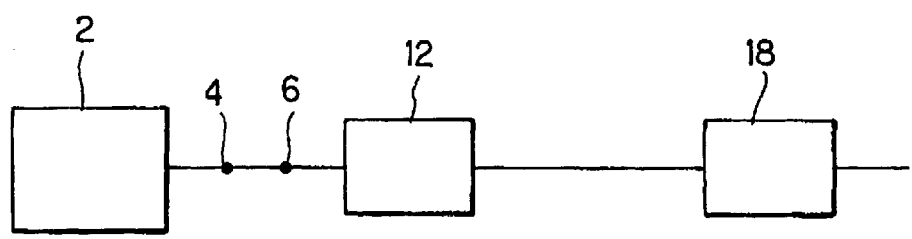
FIG. 4 is a schematic view showing an exhaust gas purification system used in Comparative Example 1.

As shown in FIG. 4, the catalyst C (12) was disposed at an upstream position of the exhaust gas flow path of an engine (2). Between the engine (2) and the catalyst C (12) were provided an $O_2$ sensor (4) for A/F control, at an upstream position and a secondary air inlet (6) for light-off acceleration, at a downstream position. The distance between engine manifold outlet and catalyst C (12) was set at 600 mm. Further, the catalyst F (18) was disposed at a position 1,200 mm distant from the engine manifold outlet.

(System D)

Figure 5:
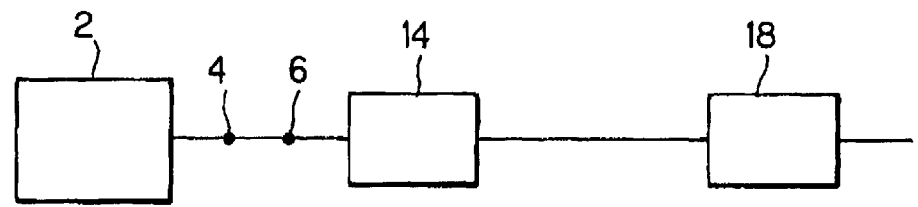
FIG. 5 is a schematic view showing an exhaust gas purification system used in Comparative Example 2.

As shown in FIG. 5, the catalyst D (14) was disposed at an upstream position of the exhaust gas flow path of an engine (2). Between the engine (2) and the catalyst D (14) were provided an $O_2$ sensor (4) for A/F control, at an upstream position and a secondary air inlet (6) for light-off acceleration, at a downstream position. The distance between engine manifold outlet and catalyst D (14) was set at 600 mm. Further, the catalyst F (18) was disposed at a position 1,200 mm distant from the engine manifold outlet.

(System E)

Figure 6:
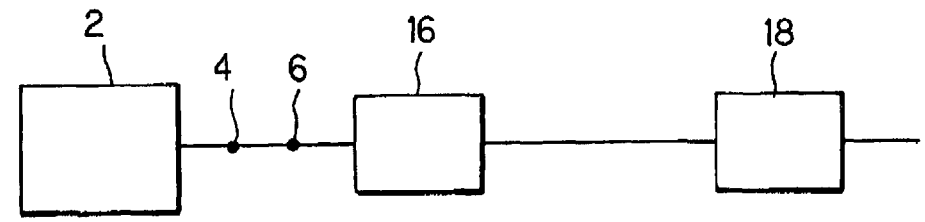
FIG. 6 is a schematic view showing an exhaust gas purification system used in Comparative Example 3.

As shown in FIG. 6, the catalyst E (16) was disposed at an upstream position of the exhaust gas flow path of an engine (2). Between the engine (2) and the catalyst E (16) were provided an $O_2$ sensor (4) for A/F control, at an upstream position and a secondary air inlet (6) for light-off acceleration, at a downstream position. The distance between engine manifold outlet and catalyst E (16) was set at 600 mm. Further, the catalyst F (18) was disposed at a position 1,200 mm distant from the engine manifold outlet.

(System F)

Figure 7:
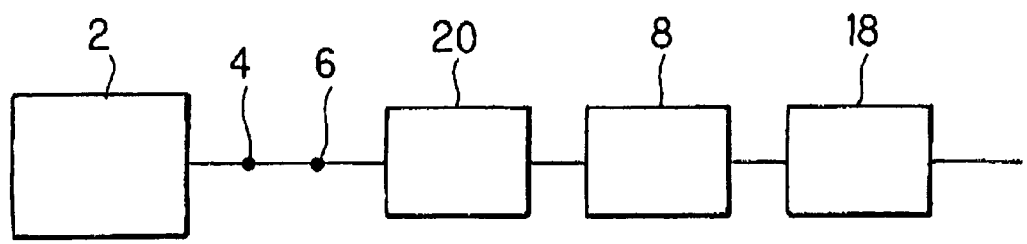
FIG. 7 is a schematic view showing an exhaust gas purification system used in Example 3.

As shown in FIG. 7, the adsorbent A (20) was disposed at an upstream position of the exhaust gas flow path of an engine (2), and the catalyst A (8) was disposed at a downstream position. Between the engine (2) and the adsorbent A (20) were provided an $O_2$ sensor (4) for A/F control, at an upstream position and a secondary air inlet (6) for light-off acceleration, at a downstream position. The distance between engine manifold outlet and adsorbent A (20) was set at 600 mm. Further, the catalyst F (18) was disposed at a position 1,200 mm distant from the engine manifold outlet. (System G)

Figure 8:
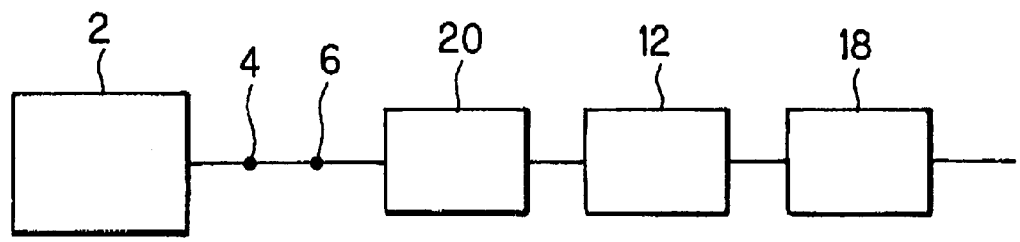
FIG. 8 is a schematic view showing an exhaust gas purificatio system used in Comparative Example 4.

As shown in FIG. 8, the adsorbent A (20) was disposed at an upstream position of the exhaust gas flow path of an engine (2), and the catalyst C (12) was disposed at a downstream position. Between the engine (2) and the adsorbent A (20) were provided an $O_2$ sensor (4) for A/F control, at an upstream position and a secondary air inlet (6) for light-off acceleration, at a downstream position. The distance between engine manifold outlet and adsorbent A (20) was set at 600 mm. Further, the catalyst F (18) was disposed at a position 1,200 mm distant from the engine manifold outlet.

[Evaluation of performances of exhaust gas purification systems]

Each of the exhaust gas purification systems A to G was mounted on a test vehicle having an engine of 4,000 cc displacement and 6 cylinders, and subjected to an FTP test (LA-4 mode). In the test, in order to obtain an oxygen-excessive exhaust gas, secondary air was introduced from the secondary air inlet of each system by the use of an air pump, at a rate of 100 l/min for 90 seconds from the start of engine cranking. The exhaust gas was collected by the CVS method and measured for HC emission. The results are shown in Table 1.

TABLE 1

|  | System used | HC emission (g/mile) |
|---|---|---|
| Example 1 | A | 0.103 |
| Example 2 | B | 0.105 |
| Example 3 | F | 0.096 |
| Comparative Example 1 | C | 0.117 |
| Comparative Example 2 | D | 0.121 |
| Comparative Example 3 | E | 0.134 |
| Comparative Example 4 | G | 0.110 |

As shown in Table 1, lower HC emissions were obtained in Examples 1 and 2 respectively using the system A and the system B respectively containing the catalyst A of the present invention and the catalyst B of the present invention, than in Comparative Example 1 using the system C containing the catalyst C having a catalyst layer thickness exceeding 100 μm. A similar result was obtained also when an adsorbent was disposed upstream of a catalyst; that is, a lower HC emission was obtained in Example 3 using the system F containing the catalyst of the present invention, than in Comparative Example 4 using the system G containing the catalyst C having a catalyst layer thickness exceeding 100 μm. Further, from the results of Example 1, Comparative Example 2 and Comparative Example 3 respectively using the catalyst A, the catalyst D and the catalyst E [these catalysts have the same catalyst layer thickness (10 μm) but are different in $Pd/Al_2O_3$ ratio and loaded Pd amount], it is clear that the $Pd/Al_2O_3$ ratio and the loaded Pd amount have each a preferable range.

As described above, the catalyst of the present invention is activated early even during the cold start of engine and can effectively purify the harmful components present in an exhaust gas, particularly the HC emitted in a large amount during the cold start. By disposing an adsorbent having an HC adsorptivity, upstream of the present catalyst, the exhaust gas purification system of the present invention can have an even higher purifiability for HC during the cold start.

What is claimed is:

1. A catalyst for exhaust gas purification, consisting of (1) a monolithic carrier having passages and partition walls of the passages and (2) alumina loaded with palladium as the only noble metal obtained by immersing alumina in a palladium solution and then firing the resulting alumina loaded on the monolithic carrier as a catalyst layer, in which catalyst the catalyst layer loaded on the partition walls of the passages of the monolithic carrier has a thickness of 5 to 100 um and a palladium/alumina ($Pd/Al_2O_3$) weight ratio in the catalyst layer of 0.03 to 0.30.

2. A catalyst for exhaust gas purification according to claim 1, wherein the thickness of the catalyst layer is 5 to 50 μm.

3. A catalyst for exhaust gas purification according to claim 1, wherein the palladium/alumina ($Pd/Al_2O_3$) weight ratio in the catalyst layer is 0.06 to 0.18.

4. A catalyst for exhaust gas purification according to claim 1, wherein the amount of palladium loaded per unit volume of monolithic carrier is 50 to 500 g/ft$^3$ ($1.76 \times 10^{-3}$ to $1.76 \times 10^{-2}$ g/cc).

5. A catalyst for exhaust gas purification according to claim 1, wherein the amount of palladium loaded per unit volume of monolithic carrier is 60 to 300 g/ft$^3$ ($2.11 \times 10^{-3}$ to $1.06 \times 10^{-2}$ g/cc).

6. A catalyst for exhaust gas purification, consisting of (1) a monolithic carrier having passages and partition walls of the passages and (2) alumina loaded with palladium as the only noble metal obtained by immersing alumina in a palladium solution and then firing the reuniting alumina loaded on the monolithic carrier as a catalyst layer, in which catalyst the catalyst layer loaded on the partition walls of the passages of the monolithic carrier has a thickness of 5 to 100 μm and a palladium/alumina ($Pd/Al_2O_3$) weight ratio in the catalyst layer of 0.03 to 0.30 and said catalyst layer further contains a rare earth element oxide additive.

7. An exhaust gas purification system disposed in an exhaust pipe of internal combustion engine, comprising (a) a catalyst for exhaust gas purification, consisting of (1) a monolithic carrier having passages and partition walls of the passages and (2) alumina loaded with palladium as the only noble metal obtained by immersing alumina in a palladium solution and then firing the resulting alumina loaded on the monolithic carrier as a catalyst layer, in which catalyst the catalyst layer loaded on the partition walls of the passages of the monolithic carrier has a thickness of 5 to 100 μm and a palladium/alumina ($Pd/Al_2O_3$) weight ratio in the catalyst layer of 0.03 to 0.30, and (b) an adsorbent disposed upstream of the catalyst (a) in the flow direction of the exhaust gas discharged from the engine, which is obtained by loading an adsorbent material having a hydrocarbon adsorptivity, on a monolithic carrier.

8. An exhaust gas purification system according to claim 7, wherein a further catalyst is disposed upstream of the adsorbent in the flow direction of the exhaust gas discharged from the engine.

* * * * *